(12) United States Patent
Sahita et al.

(10) Patent No.: US 10,210,331 B2
(45) Date of Patent: Feb. 19, 2019

(54) EXECUTING FULL LOGICAL PATHS FOR MALWARE DETECTION

(71) Applicant: McAfee, LLC, Santa Clara, CA (US)

(72) Inventors: Ravi Sahita, Portland, OR (US); Xiaoning Li, Hillsboro, OR (US); Lixin Lu, San Jose, CA (US); Lu Deng, Santa Clara, CA (US); Alexander Shepsen, Palo Alto, CA (US); Xiang Xu, Santa Clara, CA (US); Liangjun Huang, Santa Clara, CA (US); Hua Liu, Sunnyvale, CA (US); Kai Huang, Sunnyvale, CA (US)

(73) Assignee: McAfee, LLC, Santa Clara, CA (US)

(*) Notice: Subject to any disclaimer, the term of this patent is extended or adjusted under 35 U.S.C. 154(b) by 77 days.

(21) Appl. No.: 14/998,178

(22) Filed: Dec. 24, 2015

(65) Prior Publication Data
US 2017/0185778 A1    Jun. 29, 2017

(51) Int. Cl.
G06F 21/56     (2013.01)
G06F 21/53     (2013.01)

(52) U.S. Cl.
CPC ............ *G06F 21/566* (2013.01); *G06F 21/53* (2013.01); *G06F 2221/033* (2013.01)

(58) Field of Classification Search
CPC .. G06F 21/566; G06F 21/53; G06F 2221/033; G06F 21/552; G06F 21/554; H04L 63/1416; H04L 63/1425; H04L 63/1441
See application file for complete search history.

(56) References Cited

U.S. PATENT DOCUMENTS

| 5,987,610 A | 11/1999 | Franczek et al. |
| 6,073,142 A | 6/2000 | Geiger et al. |
| 6,460,050 B1 | 10/2002 | Pace et al. |
| 7,506,155 B1 | 3/2009 | Stewart et al. |

(Continued)

FOREIGN PATENT DOCUMENTS

| EP | 2881881 A2 | 6/2015 |
| WO | 2017112201 A1 | 6/2017 |

OTHER PUBLICATIONS

International Search Report and Written Opinion in International Application No. PCT/US2016/062981, dated Mar. 9, 2017, 13 pages.

(Continued)

*Primary Examiner* — Yonas A Bayou
(74) *Attorney, Agent, or Firm* — Patent Capital Group

(57) ABSTRACT

Embodiments include identifying, at a logical path node, a first logical path and a second logical path; executing, by a processor implemented at least partially in hardware, a first set of instructions to follow the first logical path; storing, in a memory, a first set of information obtained from following the first logical path; evaluating, by a malware handler module implemented at least partially in hardware, the first set of information for malware; restoring, from the memory, environmental data for the first logical path node; executing, by the processor, a second set of instructions to follow the second logical path; storing, in a memory, a second set of information obtained from following the second logical path; and evaluating, by the malware handler module, the second set of information for malware.

21 Claims, 13 Drawing Sheets

(56) References Cited

U.S. PATENT DOCUMENTS

| | | | |
|---|---|---|---|
| 8,418,249 B1* | 4/2013 | Nucci | G06F 21/552 706/20 |
| 8,464,345 B2* | 6/2013 | Satish | G06F 21/552 706/20 |
| 8,782,365 B1* | 7/2014 | Mooring | G06F 8/53 711/162 |
| 9,405,570 B2 | 8/2016 | Sahita et al. | |
| 2002/0162015 A1* | 10/2002 | Tang | G06F 21/565 726/24 |
| 2005/0223238 A1* | 10/2005 | Schmid | G06F 21/563 713/188 |
| 2006/0075502 A1* | 4/2006 | Edwards | G06F 21/56 726/24 |
| 2006/0230451 A1* | 10/2006 | Kramer | G06F 21/51 726/22 |
| 2008/0222729 A1* | 9/2008 | Chen | G06F 21/566 726/24 |
| 2008/0263659 A1* | 10/2008 | Alme | G06F 21/56 726/22 |
| 2012/0192273 A1 | 7/2012 | Turbin et al. | |
| 2013/0091571 A1 | 4/2013 | Lu | |
| 2013/0117743 A1 | 5/2013 | Neiger et al. | |
| 2013/0185797 A1* | 7/2013 | Zhou | G06F 21/52 726/23 |
| 2014/0013326 A1 | 1/2014 | Neiger et al. | |
| 2014/0317745 A1* | 10/2014 | Kolbitsch | H04L 63/1416 726/24 |
| 2015/0067763 A1 | 3/2015 | Dalcher et al. | |
| 2015/0101049 A1* | 4/2015 | Lukacs | G06F 21/566 726/23 |
| 2015/0121366 A1 | 4/2015 | Neiger et al. | |
| 2015/0195106 A1* | 7/2015 | Sehr | G06F 12/1458 709/206 |

OTHER PUBLICATIONS

PCT Jul. 5, 2018 International Preliminary Report on Patentability from counterpart International Application PCT/US2016/062981 dated Jul. 5, 2018; 12 pages.

* cited by examiner

EXECUTING FULL LOGICAL PATHS FOR MALWARE DETECTION

TECHNICAL FIELD

This disclosure pertains to computing security, and more particularly, to executing conditional branches of an executable file for detecting malware.

BACKGROUND

Sandboxes and other secure environments can be used to execute unknown or suspicious executable files or applications without risking exposure of computing systems to malware or other malicious agents. Malware can be detected and malware behavior monitored and evaluated by executing applications within the sandbox environment.

BRIEF DESCRIPTION OF THE DRAWINGS

FIG. 2C is shown for clarity as FIG. 2C-1 and FIG. 2C-2 between two pages.

DETAILED DESCRIPTION

Some implementations of sandbox environments allow for behavior analysis within the execution of the executable application. The behavior analysis is performed based on the execution of logical paths, each of which depends on one or more conditions being true, such as software conditions (Operating System with its configuration and installed applications) and hardware conditions. During execution, a single execution path is usually traversed, while alternate logical paths are left unexecuted. The result is often false negatives for malware analysis because malware may depend on the execution of logical paths left unexecuted by the behavior analysis.

This disclosure describes the total behavior identification of active content by complete execution of an executable application's full logical paths. Executing the full logical path provides full malware's behavioral analysis based on multi-directional processing of conditional application statements, such as jump operations, switch conditions, exception handling, etc.

The techniques described herein can be performed in cooperation with execution profiling (EXP-C) and backup/restoring of environmental data (registers, such as general registers, segment registers, index and pointers, and indicators, etc., file handlers, hive handlers, process handlers, physical data, such as disk files modified during execution of the other conditional path, etc.) that will ensure of restoration point of previously executed instructions and successful execution to the next available application logical branch.

The Full Logic Path application facilitates replicating the examining source through all of its logical branches with recording of behaviors based on layered approach. Execution based on EXP-C will make the Full Logic Path application invisible to samples (malwares) hence providing a very accurate and stable flow control method.

In general, the execution of the full logical path includes:
1. Backing up environmental data (registers, file, process and hive handles, etc.);
2. Executing a set of available instructions to the next "jump" condition within ExP-C interface functions;
3. Recording APIs/Parameters calls;
4. Restarting the jump-start instruction;
5. Restoring environmental data at jump-start instruction;
6. Executing next set of instructions;
7. Recording APIs/Parameters calls; and
8. Repeating to the next jump call.

Further analysis of the collected data will dictate the final verdict of sample maliciousness.

Figure 1:
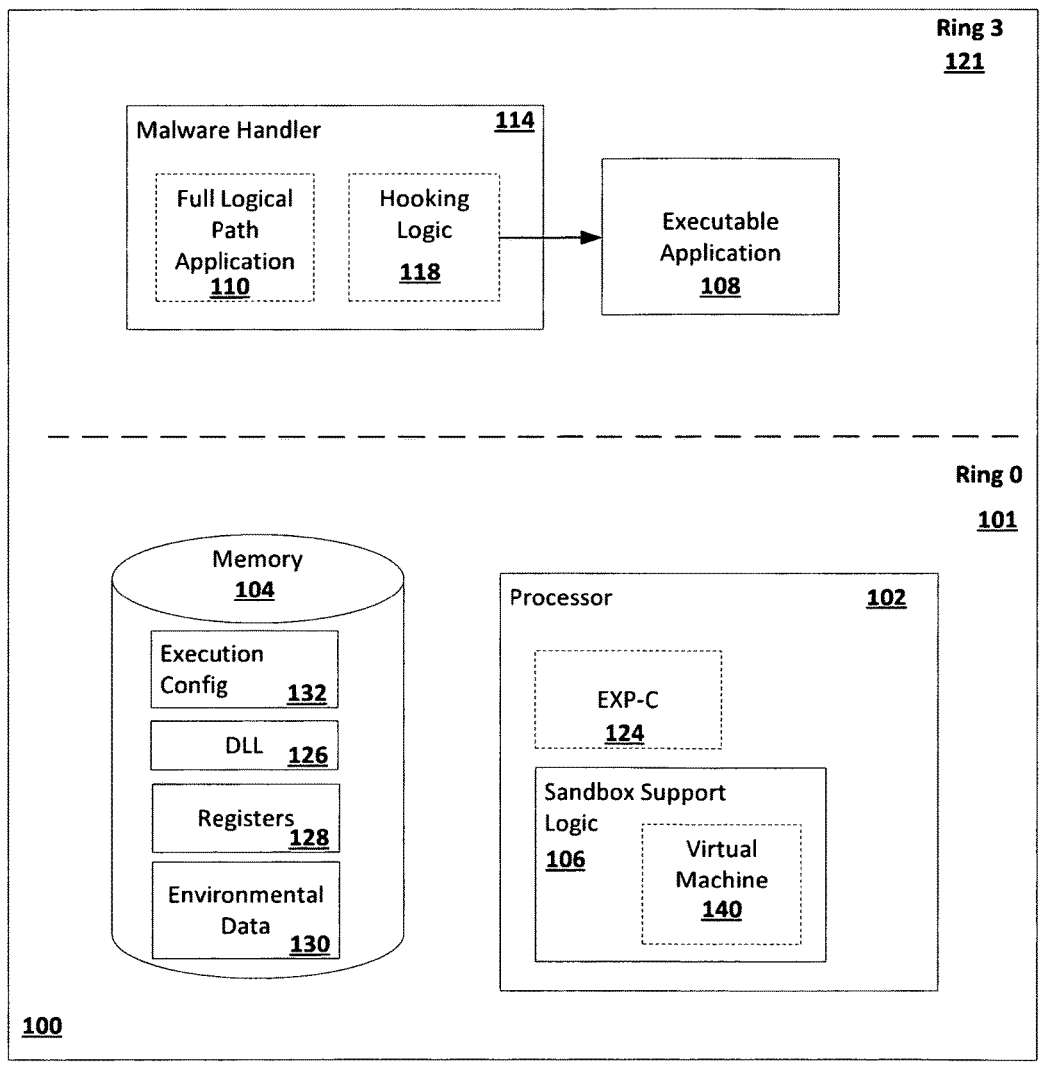
FIG. 1 is a schematic block diagram of a computing device for executing an application in a sandbox for detecting and monitoring malware in accordance with embodiments of the present disclosure.

FIG. 1 is a schematic block diagram of a computing device 100 for executing an application in a sandbox for detecting and monitoring malware in accordance with embodiments of the present disclosure. Computing device 100 can include a personal computer, a server, a tablet, a smart phone or other computing system. Some features shown in FIG. 1 may be moved to remote servers or to the cloud, as opposed to or in addition to being local to the computing device 100.

Computing device 100 includes a processor 102. Processor 102 can be implemented at least partially in hardware. Processor 102 is configured to execute instructions, programs, API, and otherwise control other hardware and software modules. Processor 102 can also be used in conjunction with execution profiling module (EXP-C) 124, described in more detail below.

Computing device 100 also include a memory 104. Memory 104 can be any type of storage, such as a magnetic hard drive, solid state drive, flash memory, etc. Memory 104 can store data, such as execution configuration information 132 and environmental data 130. Memory 104 can store dynamically linked libraries 126, as well as other programs and application programming interfaces (APIs). Memory 104 can include one or more registers 128.

Computing device 100 can include an executable application 108. For the purposes of the following specification, executable application 108 can include any complied binary application (e.g., .executable application or dynamical link libraries in a Microsoft Windows® environment), browser plug-in applications, browser or application scripts (e.g., Javascript™ or Visual Basic® script), operating system control scripts (e.g., .bat files in a Microsoft Windows® environment or C-shell scripts in a Unix environment), and run-time interpreted code or applets (e.g., Java™ applets, Visual Basic® Controls, .Net™ code). Executable application 108 can encompass multiple individual processing units, such as processes, threads, and fibers. Additionally, some large executable applications may utilize dynamic link libraries (DLLs), scripts, or plug-in components to extend or enhance basic functionality. Within the following specification an executable application 108 may be referred to variously as a process, an application, an executable, or simply as software.

Computing device 100 also includes a sandbox support logic 106 for storing instructions that can be executed by the processor 102. Sandbox support logic 106 may be implemented at least partially in hardware. Sandbox support logic 106 can be local to computing device 100. The sandbox support logic 106 can access the dynamically linked library (DLL) 126, which can include application program interfaces, runtime engines, and other programs. Sandbox support logic 106 can also access information in registers 128 for executing branch instructions in the executable application 108. Registers 128 can be populated upon loading of the executable application 108. Registers 128 can be accessed to execute instructions associated with the execution of executable application 108.

The sandbox support logic 106 can create an execution environment for an executable application 108 that sets a privilege level for accessing other programs, memory address spaces, network accesses, registers, etc. of the computing device 100. By creating a secure execution environment (referred to as a sandbox), unknown or untrusted code can be safely executed without allowing the unknown or untrusted code from accessing vital or vulnerable areas of the computing device 100.

A sandbox can be a segmented portion of a host computing device 100 that allows execution of executable application 108 in a secure manner. For example, sandbox shields executable application 108 from directly accessing certain resources or devices that may be available within a unsecured execution environment. A sandbox can be configured to provide various levels of restriction of the operations attempted by an executable application 108 based, for example, on the executable application's level of trustworthiness.

A sandbox can be instantiated at runtime of the executable application 108. In some implementations, the program that runs the execution environment provides a sandbox environment. In some implementations, the sandbox support logic 106 can create a virtual machine 140 to simulate or virtualize the execution environment needed to run the executable application 108. The virtual machine 140 can simulate the resources, processing, and process address space used by the executable application 108, and isolate the protected execution environment from the host computing device 100.

Hooking logic 118 can be implemented in hardware, software, or a combination of hardware and software. Hooking logic 118 can be used to implant code into the DLL 126 engine, either statically or dynamically at API calls. In some embodiments, the hooking logic 118 can implant code into the engine that calls or executes the sandbox 106 operation, such that the executable application 108 is run within the sandbox 106.

The computer device 102 also includes a malware handler 114 that can be implemented in hardware, software, or a combination of hardware and software. The malware handler 114 is configured to analyze code and other data stored in sandbox support logic 106 for malware or other malicious agents. The malware handler 114 also monitors execution of code in the sandbox 106 to determine the presence of absence of malware or other malicious agents. In some embodiments, malware handler 114 can include a proprietary malware analysis engine, such as the McAfee Advanced Threat Detector (MATD)™.

In some embodiments, the computing device 100 is configured for execution profiling (EXP-C) 124. EXP-C 124 can perform heap allocation tracking as well as performing checks on each execution branch taken by the script. An example of EXP-C can be found at, among other documents, U.S. patent application Ser. No. 14/129,246 filed on Apr. 10, 2014. EXP-C can be used to monitor the script execution events without modifying system APIs in order to get chance to examine possible shell code or heap spraying or other potential indicators of malware. The computing device 100 can include microcode installed to utilize EXP-C features.

In certain aspects of the embodiments, hooking logic 118 implants code into the DLL engine to call the sandbox 106. The hooking logic 118 can also call the full logical path application 110, which can run the executable application 108 in the sandbox 106. The full logical path application (FLPA) 110 can run inside the sandbox environment 112 and can execute each logical branch of the executable application 108.

The FLPA 110 can simulate a run-time execution of the executable application 108 from within the secure environment of the sandbox 106. The FLPA 110 can force the execution of all or a subset of all logical paths that the executable application 108 includes. In addition or in the alternative, the FLPA 110 can implement EXP-C to execute each branch of the executable application. Additionally, FLPA 110 can backup environmental data 130 for each node of a logical path prior to execution. The FLPA 110 can restore the environmental data 130 of a parent node after a branch is executed to completion so as to execute the next branch from the parent node. The FLPA 110 can execute instructions for the executable application 108 and access registers 128 to carry out the execution of the instructions.

Figure 2A:
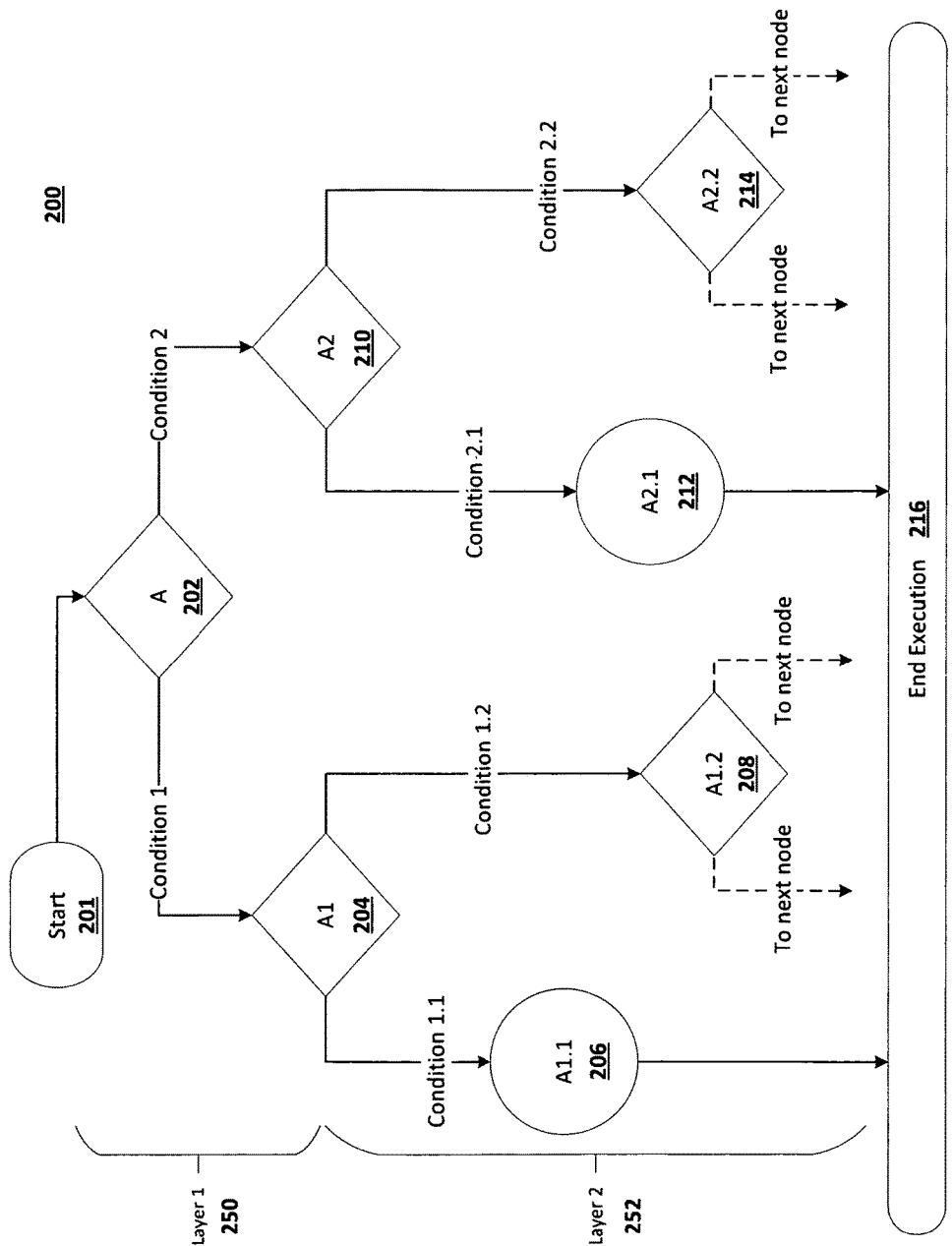
FIG. 2A is a schematic block diagram of a logical path including a parent node and child node in accordance with embodiments of the present disclosure.

FIG. 2A is a schematic block diagram of a full logical path 200 including a parent node and child node in accordance with embodiments of the present disclosure. Full logical path 200 is shown to include nodes (illustrated as diamonds for nodes that include multiple branches and circles for nodes that do not include multiple branches). Each node can represent a set of instructions that are to be executed. For nodes with multiple branches, the node includes instructions that include alternative instructions depending on one or more conditions. For example, a set of instructions may include an {if . . . else} type of statement (or multiple nested {if . . . else} statements). Other types of branch instructions are also contemplated, such as jumps, switches, etc.

Logical paths are illustrated as solid lines with directional arrows. Additionally, diagram 200 is shown to include Layer 1 and Layer 2. Layer 1 represents a first layer of nodes, which includes a parent node A 202 and two child nodes A1

204 and A2 210 that are immediately subordinate to the parent node A 202. Layer 2 represents a second level of path traversal, and in the example diagram shown in FIG. 2A, layer 2 includes child nodes A1 204 and its respective grandchild nodes A1.1 206 and A1.2 208, as well as child node A2 210 and its respective grandchild nodes A2.1 212 and A202 214.

The logical path begins at a starting point 201 that leads to the first node of the logical path—referred to here as a parent node A 202. The parent node 202 is shown to include two logical paths: satisfying a set of conditions "1" (e.g., hardware conditions, software conditions, etc.) leads to first child node A1 204 via a first logical path; satisfying a set of conditions "2" leads to a second child node A2 210 via a second logical path. Parent node A 202 is shown with two logical branches for ease of explanation, but it is understood that any node can include a different number of branches. For example, a node may only include one branch; in another example, a node may include multiple branches.

First child node A1 204 is represented as a node that include two branches: satisfying a set of conditions "1.1" would lead to grandchild node A1.1 206; and satisfying a set of conditions "1.2" would lead to grandchild node A1.2 208. Grandchild node A1.1 206 is represented as a node with one subsequent logical path, which when executed terminates execution 216. Grandchild node A1.2 208 is represented as having two logical branches (though there could be more). The logical branches from grandchild node A1.2 208 are shown as dotted lines with arrow to mean that further subordinate branches could exist prior to termination of execution 216.

Similarly second child node A2 210 is represented as a node that include two branches: satisfying a set of conditions "2.1" would lead to grandchild node A2.1 212; and satisfying a set of conditions "2.2" would lead to grandchild node A2.2 214. Grandchild node A2.1 212 is represented as a node with one subsequent logical path, which when executed terminates execution 216. Grandchild node A2.2 214 is represented as having two logical branches (though there could be more). The logical branches from grandchild node A2.2 214 are shown as dotted lines with arrow to mean that further subordinate branches could exist prior to termination of execution 216.

Figure 2B:
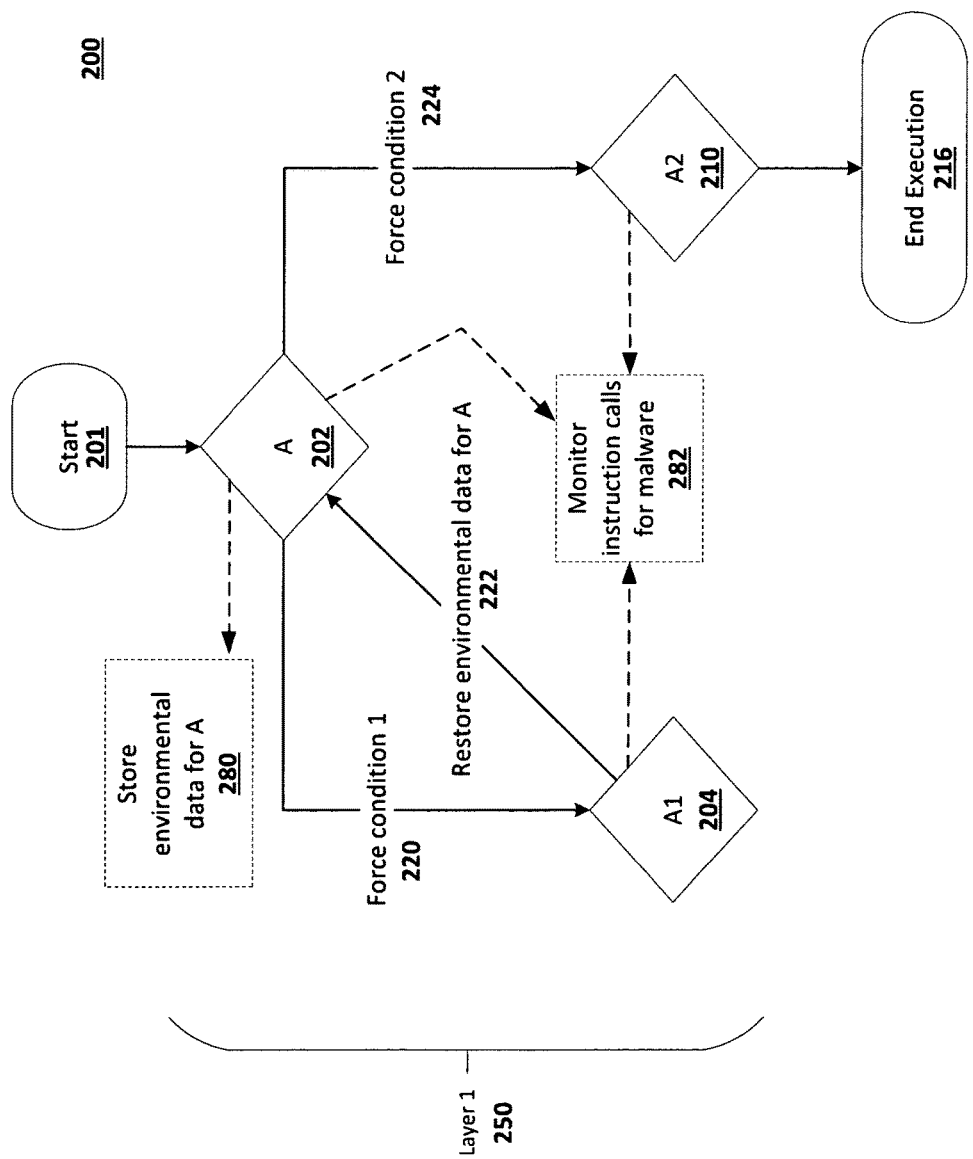
FIG. 2B is a schematic block diagram of the execution of a full logical path for a single layer of branches of the logical path in accordance with embodiments of the present disclosure.

FIG. 2B is a schematic block diagram of the execution of a full logical path 200 for a single layer of branches of the logical path in accordance with embodiments of the present disclosure. FIG. 2B illustrates an embodiment of the present disclosure that includes the execution of Layer 1 250 of the logical path 200. In some embodiments, the Full Logic Path Application can be configured to execute all layers of the full logical path 200 or a subset of layers. In FIG. 2B, Layer 1 250 of full logical path 200 is illustrated to be executed. As before, solid lines represent execution paths with arrows showing direction of the execution. In FIG. 2B, dotted lines represent actions taken at certain points in the execution.

In FIG. 2B, execution begins at a starting point 201. The parent node A 202 is encountered. Environmental data associated with parent node A 202 is backed up (or stored) (280). Environmental data can include register information, software and hardware conditions, etc. The FLPA can execute instructions one-by-one and collect API traces. For example, at parent node A 202, the FLPA can execute instructions associated with the parent node A 202. In this example, parent node A 202 includes a first branch instruction that depends on satisfying condition "1" (220). FLPA forces condition "1" by loading the corresponding information into the register and executing instructions based on the information in the register. FLPA sets a logical "break-point" to the next conditional instruction.

Forcing the condition "1" allows for the execution of the instructions at child node A1 204. Execution of instructions often involves reading and/or writing to memory, calling other applications, network locations, or accessing certain parts of the register. Each action taken in executing instructions is added to a collection of already collected instructions within "logical path" and evaluated against the rulesets of generic malware behaviors (282).

In FIG. 2B, because only Layer 1 is configured for evaluation, after the instructions at child node A1 204 are executed, the FLPA will restore the environmental data for parent node A 202 (222). This way, parent node A 202 can be executed again but for the second logical path. The FLPA can force condition "2" to traverse the second logical path (224). The instructions at child node A2 210 can be executed. The calls and instructions for child node A2 210 can be monitored for malware.

Because only Layer 1 250 is configured for evaluation in this example embodiment, after the instructions for child node 210 are executed, the execution can terminate 216.

Figures 1, 2C:
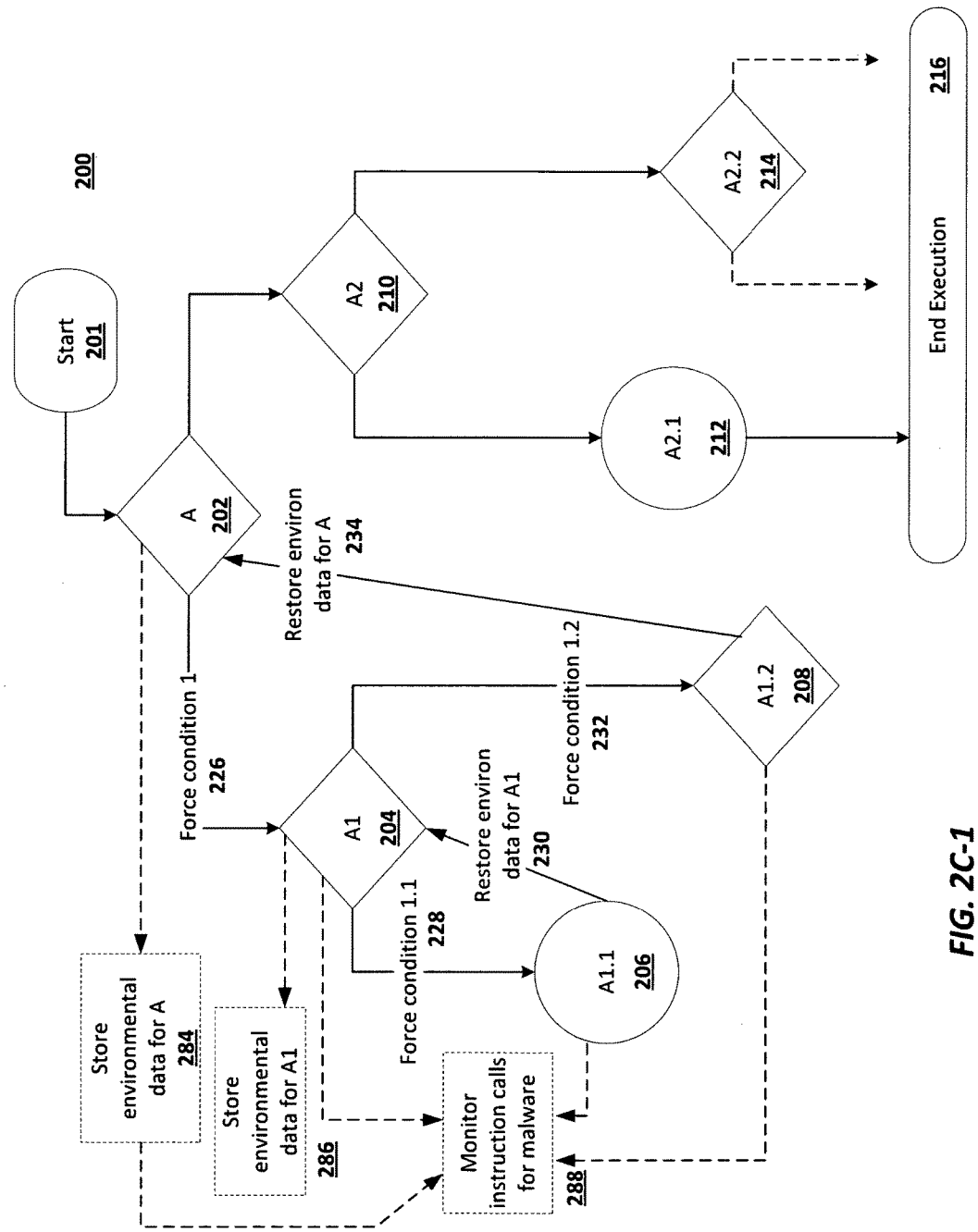
FIG. 2C is a schematic block diagram of the execution of a full logical path for two layer of branches of the logical path in accordance with embodiments of the present disclosure.

FIG. 2C is a schematic block diagram of the execution of a full logical path for two layer of branches of the logical path in accordance with embodiments of the present disclosure. FIG. 2C is shown for clarity as FIG. 2C-1 and FIG. 2C-2 between two pages.

FIG. 2C is similar to FIG. 2B in that the FLPA forces conditions and executes instructions for each nodes. In FIG. 2C, both Layer 1 250 and Layer 2 252 are configured for execution. Starting with FIG. 2C-1, at the outset, the environmental data for parent node A 202 is stored (284). The parent node A 202 can be evaluated for malware (288). Condition "1" is forced to arrive at child node A1 204 (226).

The environmental data for child node A1 is stored (286). Child node A1 204 is executed so that it can be evaluated for malware (288). In this example, childe node A1 204 include instructions that result in two possible logical branches.

The FLPA can force condition "1.1" to arrive at grandchild node A1.1 206 (228). Grandchild node A1.1 206 can be executed by FLPA, and the resulting execution calls can be monitored for malware 288. The FLPA can restore the environmental data for child node A1 204 (230) so the FLPA can execute the other branch from child node A1 204.

The FLPA can force condition "1.2" to arrive at grandchild node A1.2 208 (232). The instructions at grandchild node A1.2 208 can be executed by the FLPA. The execution calls can be monitored for malware (288).

If there are other Layer 2 grandchild nodes that are subordinate to child node A1 204, the environmental data for child node A1 204 is restored, and the conditions are forced to arrive at the next grandchild node. This process is repeated iteratively until all grandchild nodes that are subordinate to child node A1 204 have been executed and evaluated for malware.

After the last grandchild node subordinate to child node A1 204 has been executed and evaluated for malware, the environmental data for parent node A 202 is restored (234).

Figures 2, 2C:
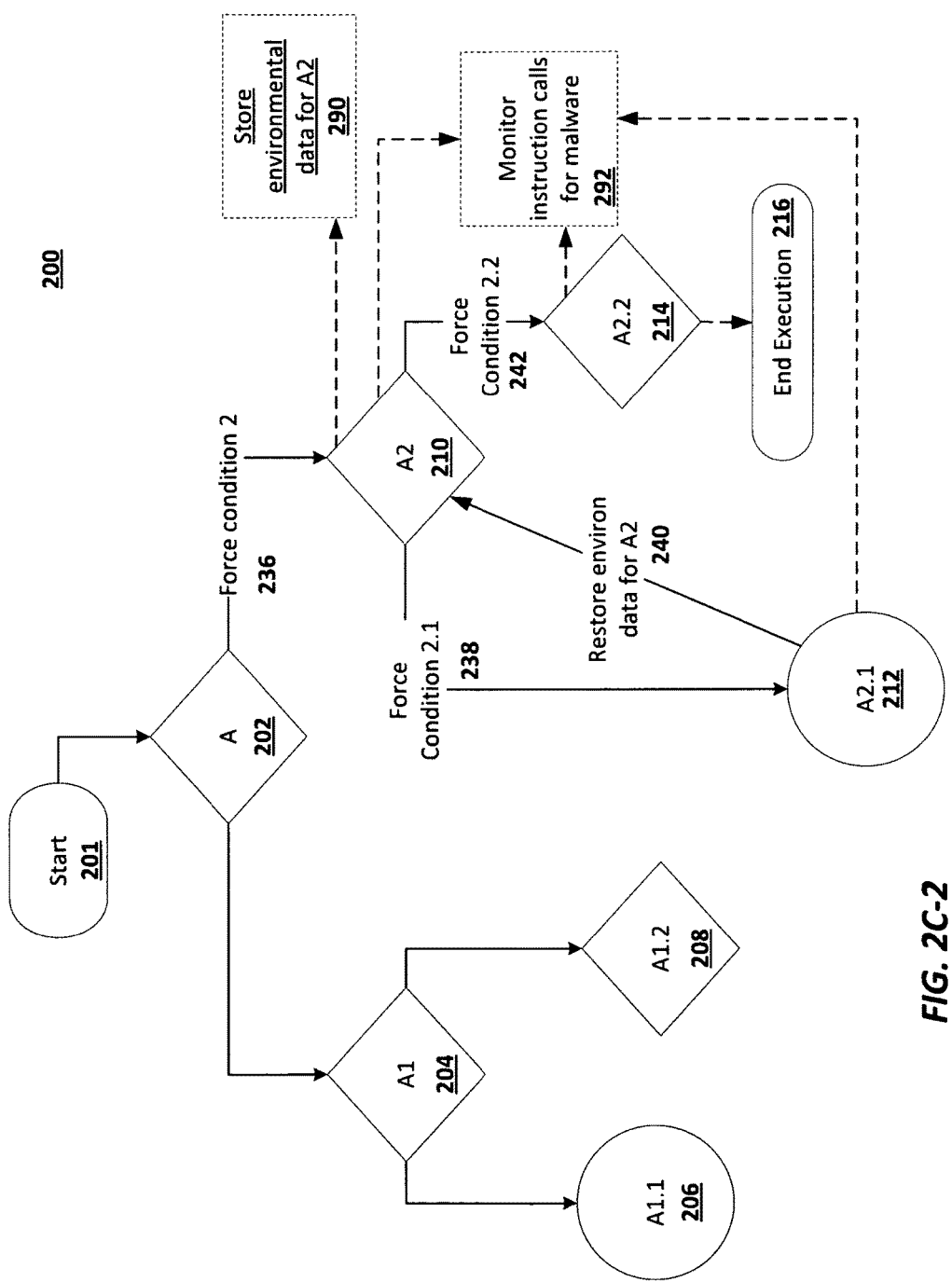

Turning now to FIG. 2C-2, which illustrates a continuation from FIG. 2C-1, FLPA executes the instructions at parent node A 202 to trigger the branch to child node A2 210. FLPA forces condition "2" to trigger this branch to arrive at child node A2 210 (236). The environmental data for child node A2 210 is backed up (290).

The FLPA forces condition 2.1 to trigger a first branch from child node A2 210 to grandchild node A2.1 212 (238). In some embodiments, the execution of child node A2 210 can be monitored for malware (292). The FLPA can execute instructions for grandchild node A2.1 212. The execution of grandchild node A2.1 212 can be monitored for malware (292). The FLPA can then restore the environmental data for child node A2 210 (240).

The FLPA can force condition 2.2 to trigger branch instructions to arrive at grandchild node A2.2 214 (242). The instructions at grandchild node A 2.2 214 can be executed and evaluated for malware (292). After grandchild node A2.2 is evaluated, other grandchild nodes can be evaluated in a similar way. After all Layer 2 grandchild nodes have been executed and evaluated, the execution can terminate 216.

FIG. 2A-C only show two layers of node sets being evaluated, but it is understood that any number of layers can be evaluated in a similar manner as that described above. Similarly, other configuration settings can govern how deep into the executable application the FLPA can explore. For example, the FLPA can be configured to operate within a certain amount of time. In some embodiments, the detection of malware can cause the evaluation of the executable application to terminate; in some embodiments, detection of malware of a predetermined risk or danger level can cause the exploration to terminate. In some embodiments, the evaluation does not terminate until each logical branch of the executable application has been evaluated for malware.

Figure 3A:
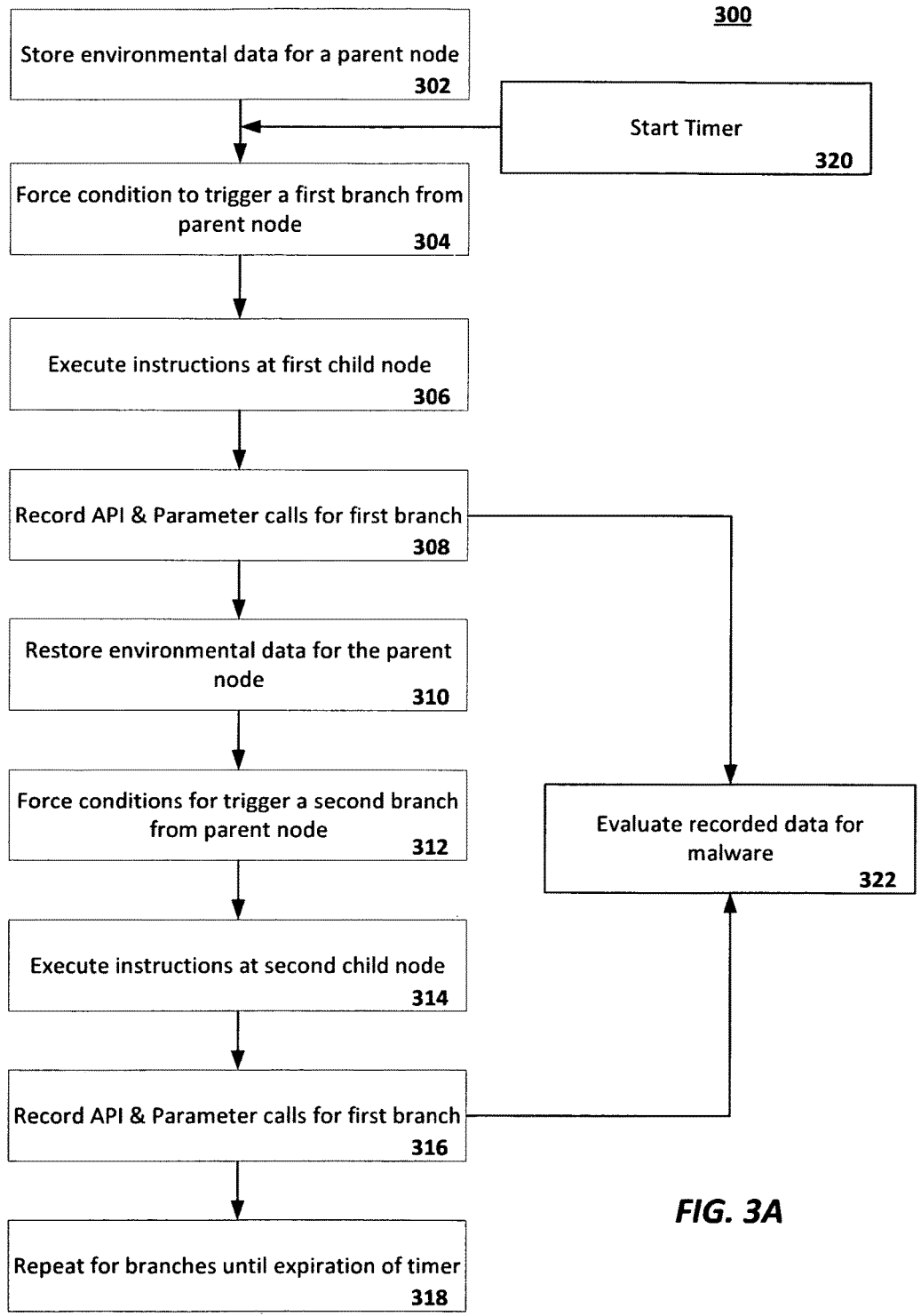
FIG. 3A is a process flow diagram for executing a full logical path in accordance with embodiments of the present disclosure.

FIG. 3A is a process flow diagram 300 for executing a full logical path in accordance with embodiments of the present disclosure. The Full Logical Path Application (FLPA) can store environmental data for a parent node (302). In some embodiments, a timer can be started (320) that is set to a predetermined value, after which execution of logical paths should terminate. The FLPA can force a condition to trigger execution of a first branch from the parent node (304). The FLPA can execute the instructions at the first child node (306). The FLPA can record API and parameters calls, as well as other information from the execution of instructions (308). The API and parameter calls, as well as other information, can be used in the identification and evaluation of malware (e.g., by a malware handler and/or EXP-C) (322).

The FLPA can restore environmental data for the parent node (310). The FLPA can force conditions at the parent node to trigger a second branch from the parent node (312). The FLPA can execute instructions at the second child node (314). The API and parameters called during execution, as well as other information, can be stored (316). The API, parameters, and other information can be used by the malware handler or EXP-C to identify, evaluate, and/or monitor for malware (322).

In this embodiment, the FLPA can continue executing branches until the expiration of the timer (318). Embodiments that use a timer to terminate execution can be used separately from or in addition to other ways of causing the execution of the executable application to terminate, such as a layer configuration or the detection of malware.

Figure 3B:
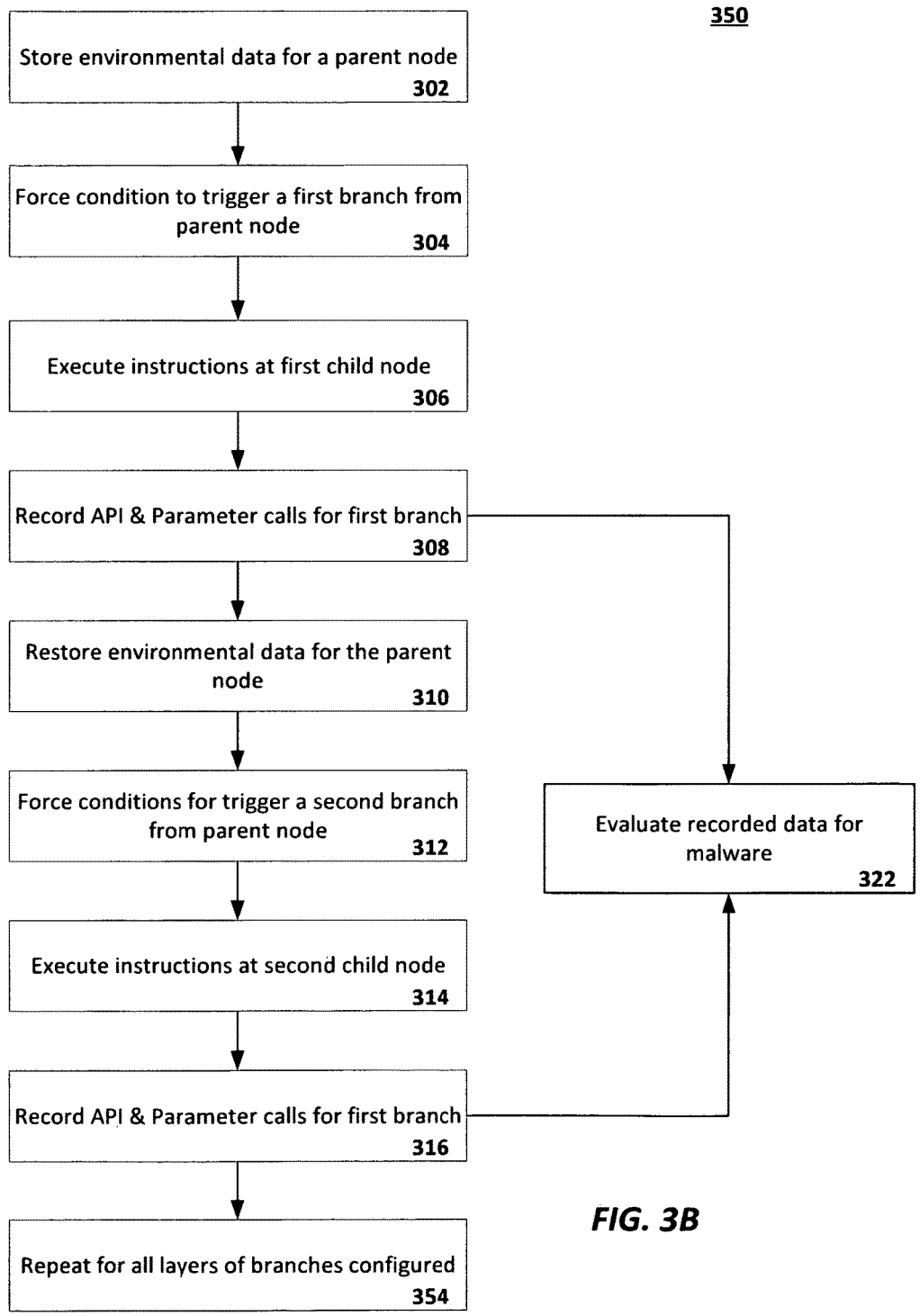
FIG. 3B is a process flow diagram for executing a full logical path in accordance with embodiments of the present disclosure.

FIG. 3B is a process flow diagram 350 for executing a full logical path in accordance with embodiments of the present disclosure. FIG. 3B is similar to FIG. 3A for how the FLPA operates. In FIG. 3B, however, the FLPA is configured to execute certain layers of nodes (352). The following steps are the same as those in the process 300 shown in FIG. 3A. The FLPA can repeat executing branch instructions and the malware handler can evaluate each set of instructions for malware until each node for each layer identified in the configuration has been executed and evaluated (354).

Figure 3C:
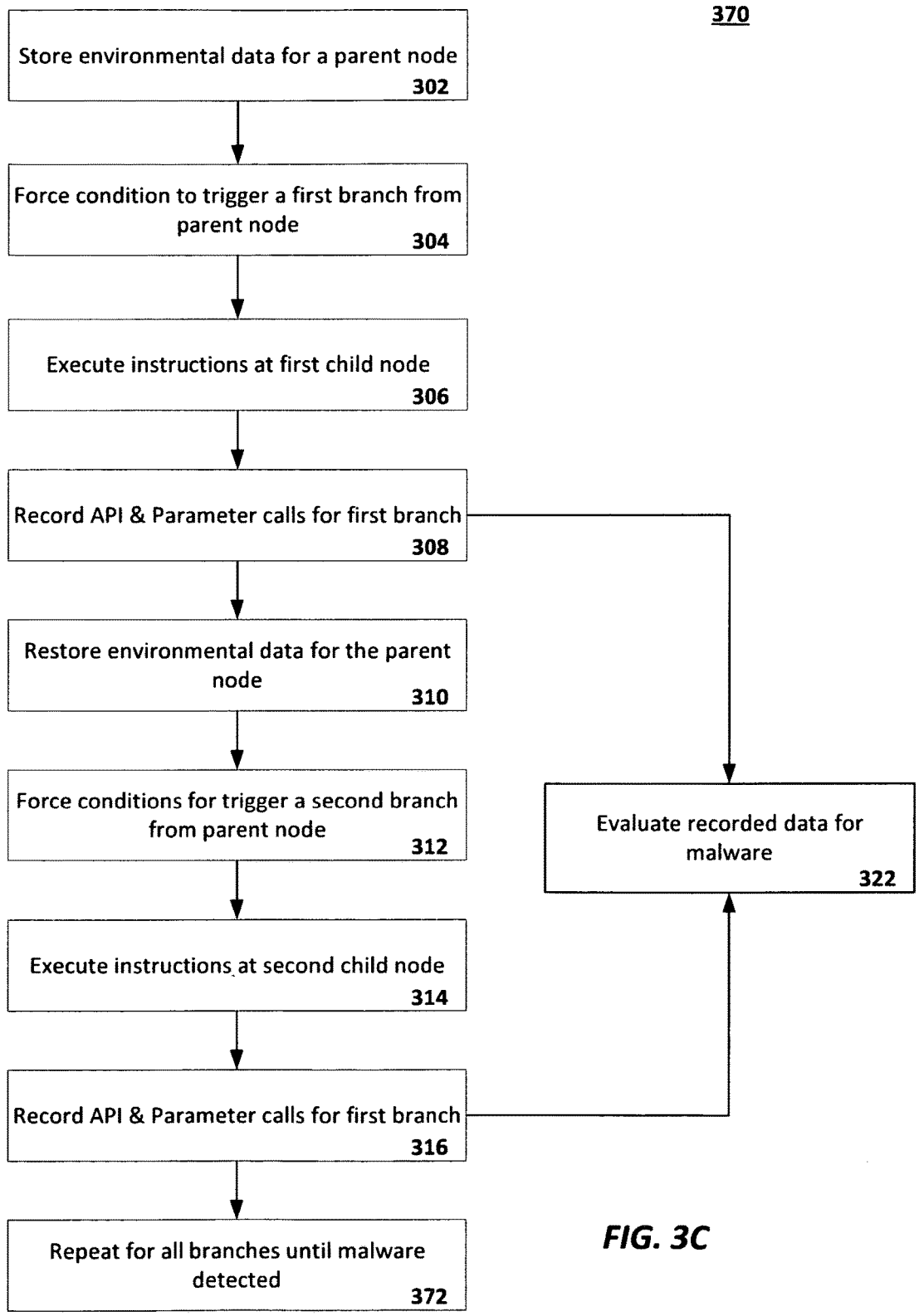
FIG. 3C is a process flow diagram for executing a full logical path in accordance with embodiments of the present disclosure.

FIG. 3C is a process flow diagram 370 for executing a full logical path in accordance with embodiments of the present disclosure. FIG. 3C is similar to FIGS. 3A and 3B for how the FLPA operates. In FIG. 3C, however, the FLPA is configured to execute instructions for all branches until malware is detected (or, in some implementations, malware of a predetermined risk or danger level is detected). The initial steps are the same as those in the process 300 shown in FIG. 3A. The FLPA can repeat executing branch instructions and the malware handler can evaluate each set of instructions for malware until the malware handler identifier malware or malware of a predetermined threat level or risk level (372).

Figure 3D:
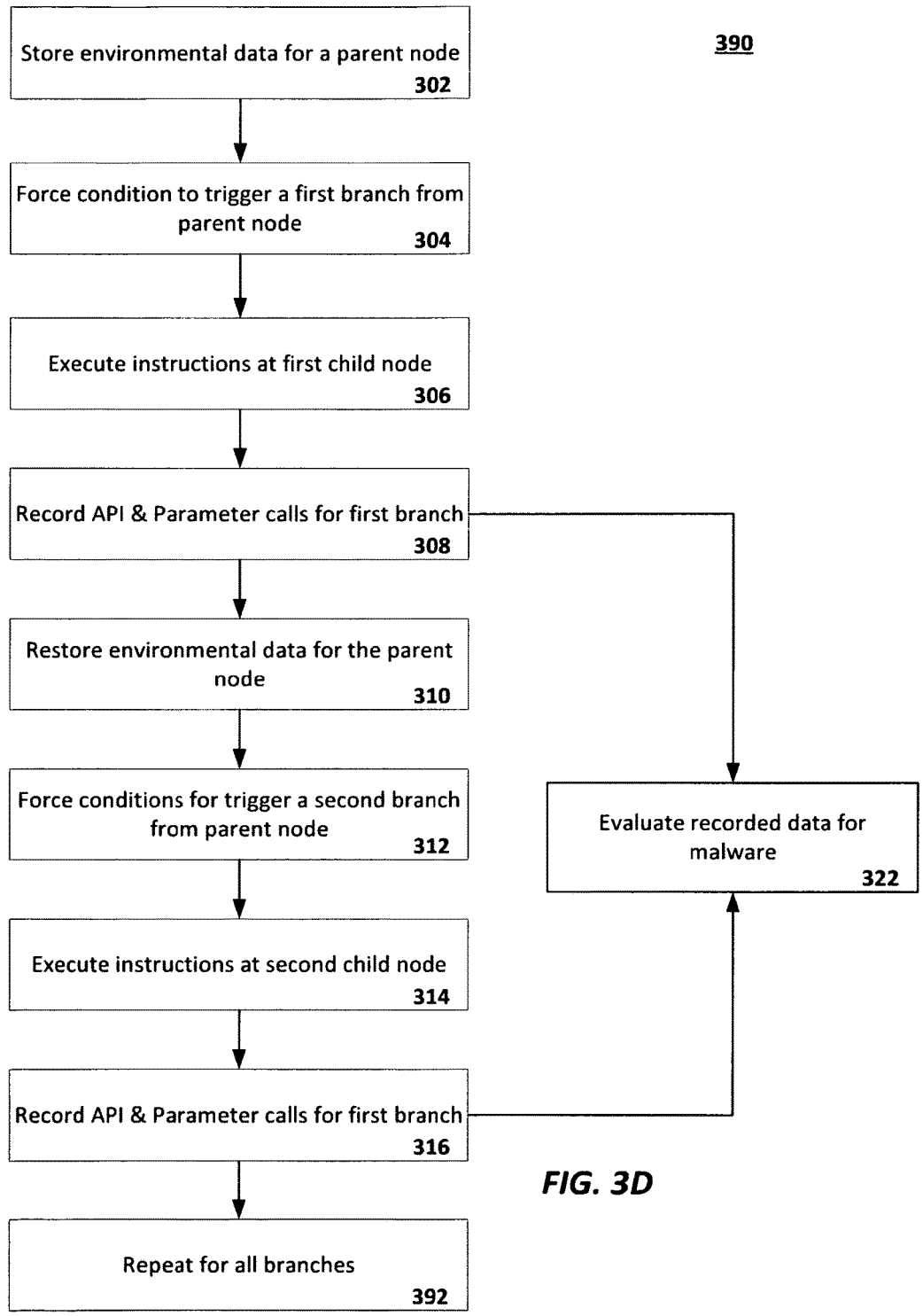
FIG. 3D is a process flow diagram for executing a full logical path in accordance with embodiments of the present disclosure.

FIG. 3D is a process flow diagram 390 for executing a full logical path in accordance with embodiments of the present disclosure. FIG. 3D is similar to FIGS. 3A and 3B and 3C for how the FLPA operates. In FIG. 3D, however, the FLPA is configured to execute instructions for all branches of the executable application. The initial steps are the same as those in the process 300 shown in FIG. 3A. The FLPA can repeat executing branch instructions and the malware handler can evaluate each set of instructions for malware until all branches have been executed and evaluated for malware (392).

Figure 5:
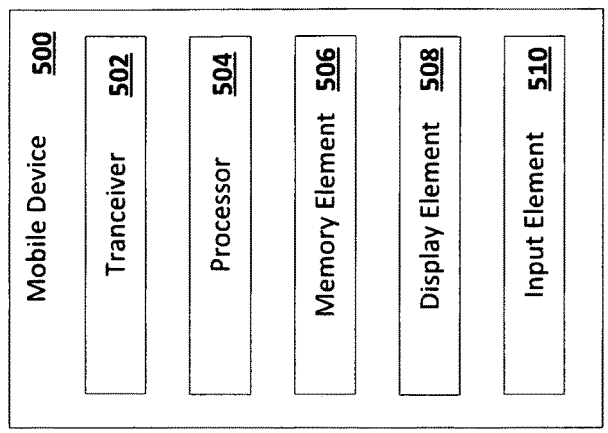
FIG. 5 is a schematic block diagram of a mobile device in accordance with embodiments of the present disclosure.
Figure 4:
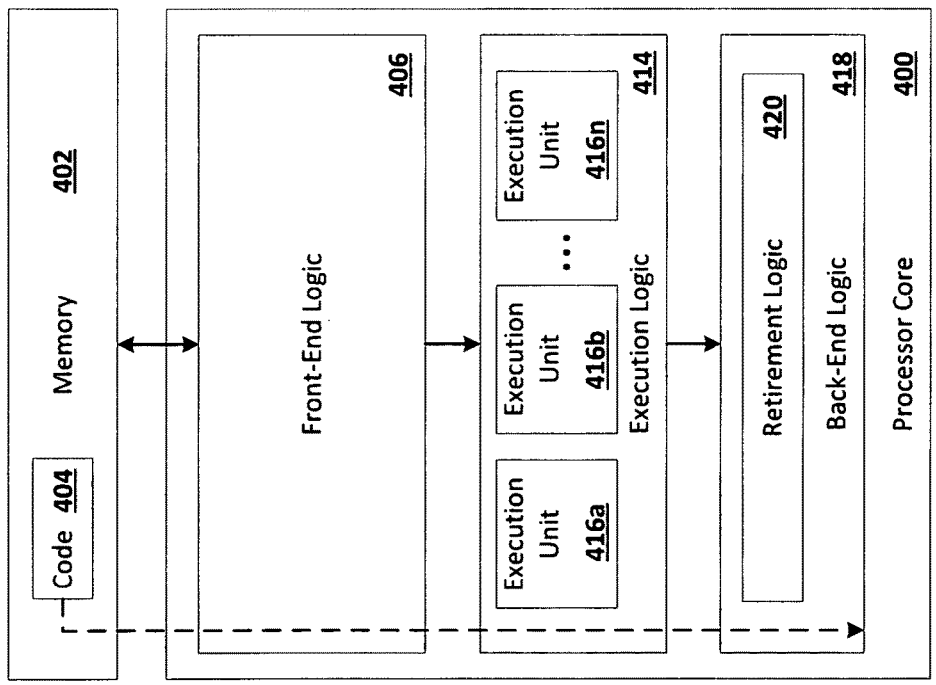
FIG. 4 is an example illustration of a processor according to an embodiment of the present disclosure.
Figure 6:
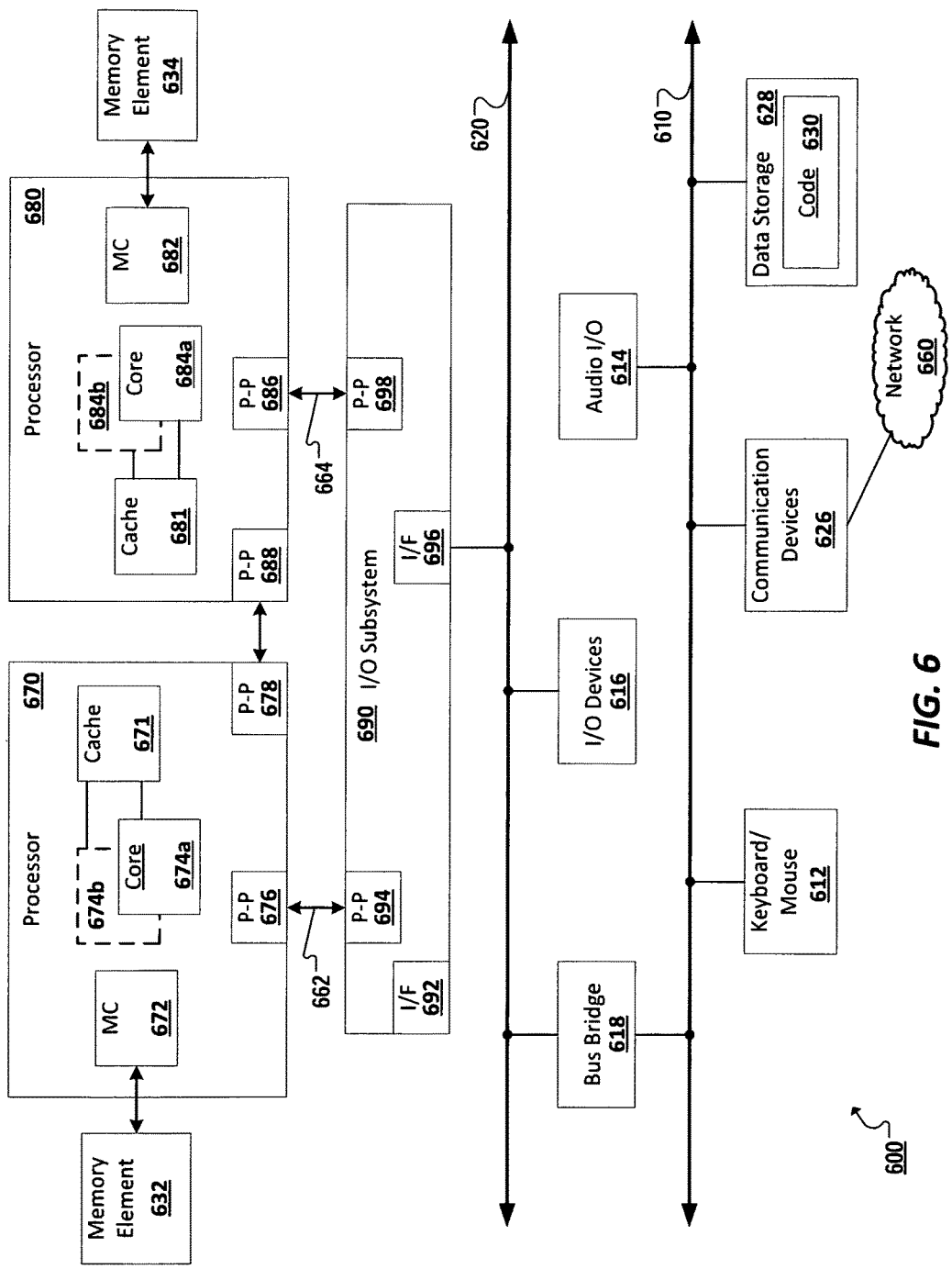
FIG. 6 is a schematic block diagram of a computing system according to an embodiment of the present disclosure.

FIGS. 4-6 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 4-6.

FIG. 4 is an example illustration of a processor according to an embodiment. Processor 400 is an example of a type of hardware device that can be used in connection with the implementations above.

Processor 400 may be any type of processor, such as a microprocessor, an embedded processor, a digital signal processor (DSP), a network processor, a multi-core processor, a single core processor, or other device to execute code. Although only one processor 400 is illustrated in FIG. 4, a processing element may alternatively include more than one of processor 400 illustrated in FIG. 4. Processor 400 may be a single-threaded core or, for at least one embodiment, the processor 400 may be multi-threaded in that it may include more than one hardware thread context (or "logical processor") per core.

FIG. 4 also illustrates a memory 402 coupled to processor 400 in accordance with an embodiment. Memory 402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 400 can execute any type of instructions associated with algorithms, processes, or operations detailed herein. Generally, processor 400 can transform an element or an article (e.g., data) from one state or thing to another state or thing.

Code 404, which may be one or more instructions to be executed by processor 400, may be stored in memory 402, or may be stored in software, hardware, firmware, or any suitable combination thereof, or in any other internal or external component, device, element, or object where appropriate and based on particular needs. In one example, processor 400 can follow a program sequence of instructions indicated by code 404. Each instruction enters a front-end logic 406 and is processed by one or more decoders 408. The decoder may generate, as its output, a micro operation such as a fixed width micro operation in a predefined format, or may generate other instructions, microinstructions, or control signals that reflect the original code instruction. Front-end logic 406 also includes register renaming logic 410 and scheduling logic 412, which generally allocate resources and queue the operation corresponding to the instruction for execution.

Processor 400 can also include execution logic 414 having a set of execution units 416a, 416b, 416n, etc. Some embodiments may include a number of execution units dedicated to specific functions or sets of functions. Other embodiments may include only one execution unit or one execution unit that can perform a particular function. Execution logic 414 performs the operations specified by code instructions.

After completion of execution of the operations specified by the code instructions, back-end logic 418 can retire the instructions of code 404. In one embodiment, processor 400 allows out of order execution but requires in order retirement of instructions. Retirement logic 420 may take a variety of known forms (e.g., re-order buffers or the like). In this manner, processor 400 is transformed during execution of code 404, at least in terms of the output generated by the decoder, hardware registers and tables utilized by register renaming logic 410, and any registers (not shown) modified by execution logic 414.

Although not shown in FIG. 4, a processing element may include other elements on a chip with processor 400. For example, a processing element may include memory control logic along with processor 400. The processing element may include I/O control logic and/or may include I/O control logic integrated with memory control logic. The processing element may also include one or more caches. In some embodiments, non-volatile memory (such as flash memory or fuses) may also be included on the chip with processor 400.

Referring now to FIG. 5, a block diagram is illustrated of an example mobile device 500. Mobile device 500 is an example of a possible computing system (e.g., a host or endpoint device) of the examples and implementations described herein. In an embodiment, mobile device 500 operates as a transmitter and a receiver of wireless communications signals. Specifically, in one example, mobile device 500 may be capable of both transmitting and receiving cellular network voice and data mobile services. Mobile services include such functionality as full Internet access, downloadable and streaming video content, as well as voice telephone communications.

Mobile device 500 may correspond to a conventional wireless or cellular portable telephone, such as a handset that is capable of receiving "3G", or "third generation" cellular services. In another example, mobile device 500 may be capable of transmitting and receiving "4G" mobile services as well, or any other mobile service.

Examples of devices that can correspond to mobile device 500 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 500 illustrated in FIG. 5 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 500 includes a transceiver 502, which is connected to and in communication with an antenna. Transceiver 502 may be a radio frequency transceiver. Also, wireless signals may be transmitted and received via transceiver 502. Transceiver 502 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 502 is connected to a processor 504, which may perform the bulk of the digital signal processing of signals to be communicated and signals received, at the baseband frequency. Processor 504 can provide a graphics interface to a display element 508, for the display of text, graphics, and video to a user, as well as an input element 510 for accepting inputs from users, such as a touchpad, keypad, roller mouse, and other examples. Processor 504 may include an embodiment such as shown and described with reference to processor 400 of FIG. 4.

In an aspect of this disclosure, processor 504 may be a processor that can execute any type of instructions to achieve the functionality and operations as detailed herein. Processor 504 may also be coupled to a memory element 506 for storing information and data used in operations performed using the processor 504. Additional details of an example processor 504 and memory element 506 are subsequently described herein. In an example embodiment, mobile device 500 may be designed with a system-on-a-chip (SoC) architecture, which integrates many or all components of the mobile device into a single chip, in at least some embodiments.

FIG. 6 is a schematic block diagram of a computing system 600 according to an embodiment. In particular, FIG. 6 shows a system where processors, memory, and input/output devices are interconnected by a number of point-to-point interfaces. Generally, one or more of the computing systems described herein may be configured in the same or similar manner as computing system 600.

Processors 670 and 680 may also each include integrated memory controller logic (MC) 672 and 682 to communicate with memory elements 632 and 634. In alternative embodiments, memory controller logic 672 and 682 may be discrete logic separate from processors 670 and 680. Memory elements 632 and/or 634 may store various data to be used by processors 670 and 680 in achieving operations and functionality outlined herein.

Processors 670 and 680 may be any type of processor, such as those discussed in connection with other figures. Processors 670 and 680 may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit.

In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration capable of achieving the functionality and features of examples and implementations provided herein.

Figure 7:
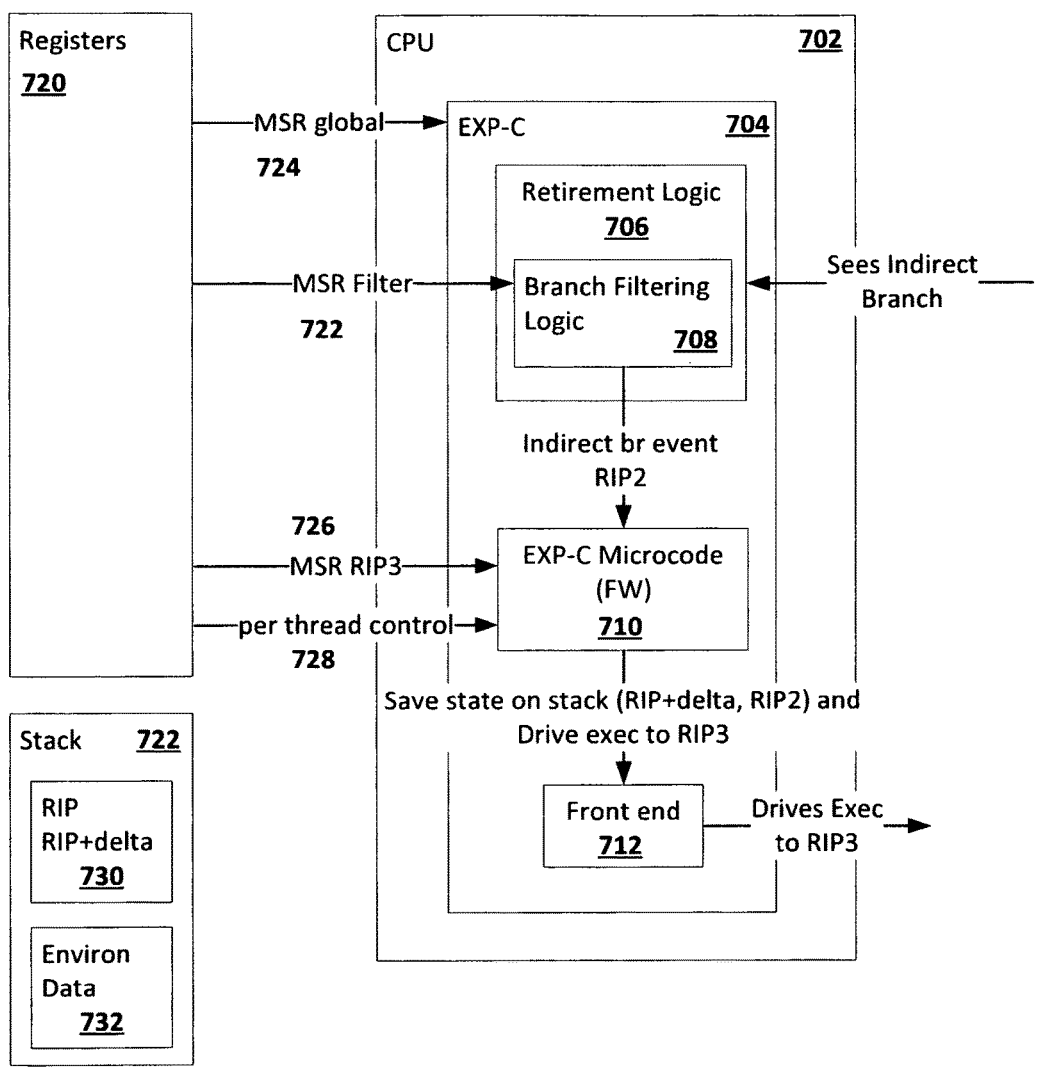
FIG. 7 is a schematic block diagram of an example hardware implementation of execution profiling in accordance with embodiments of this disclosure.

FIG. 7 is a schematic block diagram of an example hardware implementation of execution profiling in accordance with embodiments of this disclosure. FIG. 7 includes an EXP-C implementation scenario 700. EXP-C implementation scenario includes a processor 702 and a set of registers 720. The CPU includes an EXP-C logic 704 implemented at least partially in hardware. EXP-C logic 704 includes retirement logic 706, which uses branch filtering logic 708. EXP-C logic 704 also includes EXP-C microcode (firmware), though in some implementations, the EXP-C can work entirely in hardware. The CPU also includes a front end 712.

The EXP-C 704 can be enabled by a model specific register (MSR) global input from the registers set 720. The MSR global 275 input enables the EXP-C functionality in the CPU 702.

Figure 8A:
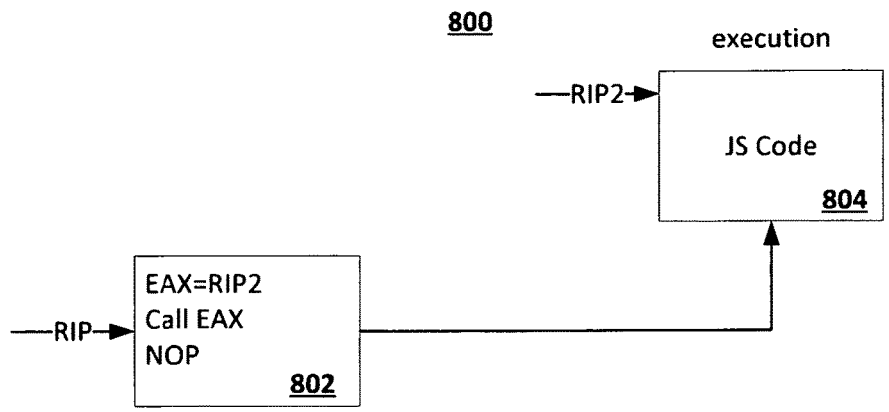
FIGS. 8A and 8B are schematic block diagrams of an example software implementation of execution profiling in accordance with embodiments of this disclosure.
Figure 8B:
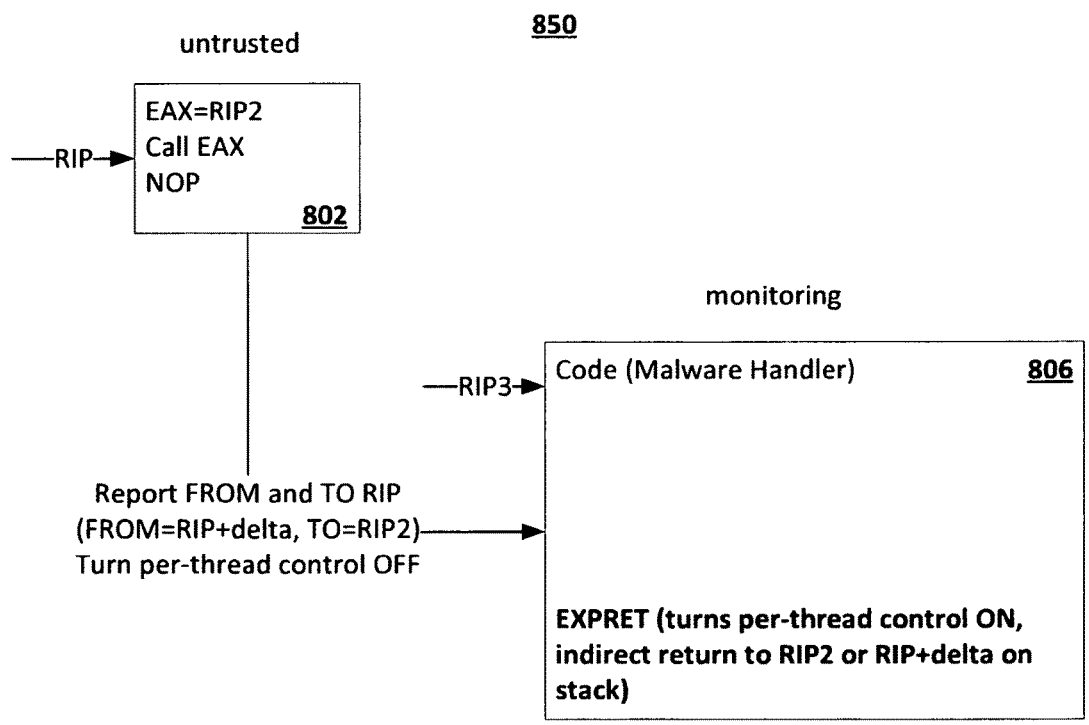

FIGS. 8A and 8B are schematic block diagrams of an example software implementation of execution profiling in accordance with embodiments of this disclosure. FIGS. 7 and 8A and 8B are discussed together.

For context, FIG. 8A shows a branch instruction 802 with an instruction pointer RIP pointing to the branch instruction and an instruction pointer RIP2 pointing to the memory location for executing the next code instruction. When EXP-C is inactive, the branch instruction is executed normally (804), and the instruction pointer RIP2 points to the new memory location for executing the code instruction.

In FIG. 8B, EXP-C is activated (prior to executing the branch instruction 802). The indirect branch 802 is identified, which includes the indirect branch (Call EAX) and the location of the indirect branch instruction (EAX=RIP2).

Turning briefly to FIG. 7, the retirement logic 706 is informed of executed operation, such as the indirect branch call 802. The branch filter logic 708 can be programmed with necessary information for identifying indirect branch calls. For example a model specific register (MSR) filter 722 can be used by the branch filtering logic 708 to provide filtering criteria necessary for the branch filtering logic 708 to types distinguish between different of calls (e.g., far indirect branches, near indirect branches, unconditional indirect jumps, far indirect jumps, near indirect returns, etc.). In the context of FIG. 8B, the branch filtering logic 708 creates an indirect branch event in the EXP-C and provides the EXP-C microcode with RIP2 address of the indirect branch. The RIP2 information comes in from the retirement logic 706 from the indirect branch execution. The EXP-C microcode 710 can then instruct the CPU frontend to drive execution of the indirect branch to another register address, RIP3 in this case.

The EXP-C microcode receives the RIP3 address from the registers set 720, which is a register address for executing code by the malware handler. Additionally, the instruction pointer state information is stored on the stack 722 (here, RIP, RIP+delta, RIP2, etc. are stored on the stack). The CPU front end 712 then drives execution of the indirect branch to RIP3. The malware handler can then inject code into the RIP3 address space for execution.

Returning to FIG. 8B, the RIP3 points to the address space for the malware handler execution. After the malware handler runs, the EXPRET can return the execution to another point in the processes saved on the stack, such as RIP+delta, RIP2, etc. The EXPRET can be configured to return execution to a position prior to execution of the indirect branch. EXPRET turns on per-thread control (which was turned off prior to running malware handler). The EXPRET then performs an indirect branch to the RIP2 (to execute the original indirect branch) or returns to RIP+delta, which is the next instruction after the EAX (in this case, the NOP in 802).

The environmental data 726 associated with an execution of an instruction can also be stored on the stack. When the EXPRET returns the execution to the RIP, RIP+delta, or other instruction pointer, the environmental data 726 for that instruction pointer can be restored. For example, if the EXPRET returns to RIP, then the environmental data for the instruction pointed at RIP can be restored.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Example 1 is a computer program product tangibly embodied on non-transient computer readable media, the computer program product including instructions operable when executed to identify, at a parent node of a logical path, a first logical path and a second logical path; execute, by a processor implemented at least partially in hardware, a first set of instructions to follow the first logical path from the parent node; store, in a memory, a first set of information obtained from following the first logical path; evaluate, by a malware handler module implemented at least partially in hardware, the first set of information for malware; restore, from the memory, environmental data for the first logical path node; execute, by the processor, a second set of instructions to follow the second logical path; store, in a memory, a second set of information obtained from following the second logical path; and evaluate, by the malware handler module, the second set of information for malware.

Example 2 may include the subject matter of example 1, wherein the instructions are further operable when executed to access one or more memory registers to execute the first set of instructions; and access one or more memory registers to execute the second set of instructions.

Example 3 may include the subject matter of any of examples 1 or 2, wherein the instructions are further operable when executed to store the execution environment for the parent node prior to executing the first set of instructions.

Example 4 may include the subject matter of any of examples 1 or 2 or 3, wherein the environmental data includes an identification of a first condition to be met for executing the first logical path and a second condition to be met for executing the second logical path.

Example 5 may include the subject matter of any of examples 1 or 2 or 3 or 4, wherein the environmental data includes parameters for executing instructions for the logical path node.

Example 6 may include the subject matter of any of examples 1 or 2 or 3 or 4 or 5, wherein the execution of the first and second logical paths are executed from a sandbox environment.

Example 7 may include the subject matter of any of examples 1 or 2 or 3 or 4 or 5 or 6, wherein the evaluation by the malware handler of the first and second sets of information is performed by execution profiling.

Example 8 may include the subject matter of any of examples 1 or 2 or 3 or 4 or 5 or 6 or 7, wherein the instructions are further operable to start a timer prior to executing the first set of instructions to follow the first logical path; and terminate execution of logical path at the expiration of the timer.

Example 9 may include the subject matter of any of examples 1 or 2 or 3 or 4 or 5 or 6 or 7 or 8, wherein the instructions are further operable to receive configuration information identifying a number of branches from the parent node to execute; and terminate execution of branches after the identified number of branches have been executed.

Example 10 may include the subject matter of any of examples 1 or 2 or 3 or 4 or 5 or 6 or 7 or 8 or 9, wherein the instructions are further operable to terminate execution of branches upon detection of malware.

Example 11 is computer implemented method including identifying, at a logical path node, a first logical path and a second logical path; executing, by a processor implemented at least partially in hardware, a first set of instructions to follow the first logical path; storing, in a memory, a first set of information obtained from following the first logical path; evaluating, by a malware handler module implemented at least partially in hardware, the first set of information for malware; restoring, from the memory, environmental data for the first logical path node; executing, by the processor, a second set of instructions to follow the second logical path; storing, in a memory, a second set of information obtained from following the second logical path; and evaluating, by the malware handler module, the second set of information for malware.

Example 12 may include the subject matter of example 11, further including accessing one or more memory registers to execute the first set of instructions; and accessing one or more memory registers to execute the second set of instructions.

Example 13 may include the subject matter of any of examples 11 or 12, further including storing the execution environment for the first logical path node prior to executing the first set of instructions.

Example 14 may include the subject matter of any of examples 11 or 12 or 13, wherein the environmental data includes an identification of a first condition to be met for executing the first logical path and a second condition to be met for executing the second logical path.

Example 15 may include the subject matter of any of examples 11 or 12 or 13 or 14, wherein the environmental data includes parameters for executing instructions for the logical path node.

Example 16 may include the subject matter of any of examples 11 or 12 or 13 or 14 or 15, wherein the execution of the first and second logical paths are executed from a sandbox environment.

Example 17 may include the subject matter of any of examples 11 or 12 or 13 or 14 or 15 or 16, wherein the evaluation by the malware handler of the first and second sets of information is performed by execution profiling.

Example 18 may include the subject matter of any of examples 11 or 12 or 13 or 14 or 15 or 16 or 17, wherein the instructions are further operable to start a timer prior to executing the first set of instructions to follow the first logical path; and terminate execution of logical path at the expiration of the timer.

Example 19 may include the subject matter of any of examples 11 or 12 or 13 or 14 or 15 or 16 or 17 or 18, wherein the instructions are further operable to receive configuration information identifying a number of branches from the parent node to execute; and terminate execution of branches after the identified number of branches have been executed.

Example 20 may include the subject matter of any of examples 11 or 12 or 13 or 14 or 15 or 16 or 17 or 18 or 19, wherein the instructions are further operable to terminate execution of branches upon detection of malware.

Example 21 is system for executing a full logical path in an executable application, the system including: a processor implemented at least partially in hardware; a memory for storing instructions; an execution application module implemented at least partially in hardware to: store environmental data associated with a parent node of the logical path; execute a first logical path from the parent node, restore environmental data associated with the parent node; and execute a second logical path from the parent node; and a malware handler module to monitor execution of each logical path for malware.

Example 22 may include the subject matter of example 21, further including a sandbox environment implemented at least partially in hardware, the execution application module to execute the first and second logical paths within the sandbox environment.

Example 23 may include the subject matter of any of examples 21 or 22, wherein the malware handler module interfaces with an execution profiler implemented at least partially in hardware to evaluate executions of each logical path for malware.

Example 24 may include the subject matter of any of examples 21 or 22 or 23, wherein the environmental data associated with the parent node of the logical path includes register setting associated with executing instructions for the parent node.

Example 25 is a computing device that includes means for identifying, at a logical path node, a first logical path and a second logical path; means for executing, by a processor implemented at least partially in hardware, a first set of instructions to follow the first logical path; means for storing, in a memory, a first set of information obtained from following the first logical path; means for evaluating the first set of information for malware; means for restoring, from the memory, environmental data for the first logical path node; means for executing a second set of instructions to follow the second logical path; means for storing a second set of information obtained from following the second logical path; and means for evaluating the second set of information for malware.

Example 26 may include the subject matter of any of examples 25, further comprising means for accessing one or more memory registers to execute the first set of instructions; and accessing one or more memory registers to execute the second set of instructions.

Example 27 may include the subject matter of any of examples 25 or 26, further comprising means for storing the execution environment for the first logical path node prior to executing the first set of instructions.

Example 28 may include the subject matter of any of examples 25 or 26 or 27, wherein the environmental data comprises an identification of a first condition to be met for executing the first logical path and a second condition to be met for executing the second logical path.

Example 29 may include the subject matter of any of examples 25 or 26 or 27 or 28, wherein the environmental data comprises parameters for executing instructions for the logical path node.

Example 30 may include the subject matter of any of examples s 25 or 26 or 27 or 28 or 29, wherein the execution of the first and second logical paths are executed from a sandbox environment.

Example 31 may include the subject matter of any of examples s 25 or 26 or 27 or 28 or 29 or 30, wherein the evaluation by the malware handler of the first and second sets of information is performed by execution profiling.

Example 32 may include the subject matter of any of examples 25 or 26 or 27 or 28 or 29 or 30 or 31, further comprising means for starting a timer prior to executing the first set of instructions to follow the first logical path; and means for terminating execution of logical path at the expiration of the timer.

Example 33 may include the subject matter of any of examples 25 or 26 or 27 or 28 or 29 or 30 or 31 or 32, further comprising means for receiving configuration information identifying a number of branches from the parent node to execute; and means for terminating execution of branches after the identified number of branches have been executed.

Example 34 may include the subject matter of any of examples 25 or 26 or 27 or 28 or 29 or 30 or 31 or 32 or 33, wherein the instructions are further operable to terminate execution of branches upon detection of malware.

Advantages of the present disclosure are readily apparent to those of skill in the art. Among the various advantages of the present disclosure include the following:

Aspects of the present disclosure can identify malware that may be hidden in obscure logical branches. The present disclosure also provides a way to discover and monitor malware for applications that are not intended for the computing device executing the code. The present disclosure contemplates countering evasion techniques against API hooks and other Sandbox specifics. Execution of the full logic path means that the malware detection can be performed independent of OS, hardware specifics, or installed software packages or versions.

While this specification contains many specific implementation details, these should not be construed as limitations on the scope of any disclosures or of what may be claimed, but rather as descriptions of features specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer program product tangibly embodied on non-transitory, computer readable media, the computer program product comprising instructions operable, when executed, to:
   identify, at a parent node of a logical path, a first logical path and a second logical path;
   responsive to storing environmental data for the parent node, execute, by a processor implemented at least partially in hardware, a first set of instructions to follow the first logical path from the parent node, wherein the environmental data is a parameter for executing an instruction for the parent node;
   store, in a memory, a first set of information obtained from following the first logical path;
   evaluate, by a malware handler module implemented at least partially in hardware, the first set of information for malware;
   restore, from the memory, the environmental data for the parent node to execute, by the processor, a second set of instructions to follow the second logical path;
   store, in a memory, a second set of information obtained from following the second logical path; and
   evaluate, by the malware handler module, the second set of information for malware.

2. The computer program product of claim 1, wherein the instructions are further operable, when executed, to:
   access one or more memory registers to execute the first set of instructions; and
   access one or more memory registers to execute the second set of instructions.

3. The computer program product of claim 1, wherein the environmental data comprises an identification of a first condition to be met for executing the first logical path and a second condition to be met for executing the second logical path.

4. The computer program product of claim 1, wherein the first and second sets of instructions are executed from a sandbox environment.

5. The computer program product of claim 1, wherein the evaluation by the malware handler module of the first and second sets of information is performed by execution profiling.

6. The computer program product of claim 1, wherein the instructions are further operable, when executed, to:
start a timer prior to executing the first set of instructions to follow the first logical path; and
terminate execution of a logical path at an expiration of the timer.

7. The computer program product of claim 1, wherein the instructions are further operable, when executed, to:
receive configuration information identifying a number of branches from the parent node to execute; and
terminate execution of a branch after the identified number of branches have been executed.

8. The computer program product of claim 1, wherein the instructions are further operable, when executed, to terminate execution of a branch upon detection of malware.

9. A computer implemented method, comprising:
identifying, at a logical path node, a first logical path and a second logical path;
responsive to storing environmental data for the logical path node, executing, by a processor implemented at least partially in hardware, a first set of instructions to follow the first logical path, wherein the environmental data is a parameter for executing an instruction for the logical path node;
storing, in a memory, a first set of information obtained from following the first logical path;
evaluating, by a malware handler module implemented at least partially in hardware, the first set of information for malware;
restoring, from the memory, the environmental data for the logical path node to execute, by the processor, a second set of instructions to follow the second logical path;
storing, in a memory, a second set of information obtained from following the second logical path; and
evaluating, by the malware handler module, the second set of information for malware.

10. The computer implemented method of claim 9, further comprising:
accessing one or more memory registers to execute the first set of instructions; and
accessing one or more memory registers to execute the second set of instructions.

11. The computer implemented method of claim 9, wherein the environmental data comprises an identification of a first condition to be met for executing the first logical path and a second condition to be met for executing the second logical path.

12. The computer implemented method of claim 9, wherein the first and second sets of instructions are executed from a sandbox environment.

13. The computer implemented method of claim 9, wherein the evaluation by the malware handler module of the first and second sets of information is performed by execution profiling.

14. The computer implemented method of claim 9, further comprising:
starting a timer prior to executing the first set of instructions to follow the first logical path; and
terminating execution of a logical path at an expiration of the timer.

15. The computer implemented method of claim 9, further comprising:
receiving configuration information identifying a number of branches from the logical path node to execute; and
terminating execution of a branch after the identified number of branches have been executed.

16. The computer implemented method of claim 9, further comprising:
terminating execution of a branch upon detection of malware.

17. A system for executing a full logical path in an executable application, the system comprising:
a processor implemented at least partially in hardware;
a memory for storing instructions;
an execution application module, implemented at least partially in hardware, to,
responsive to storing environmental data associated with a parent node of the full logical path, execute a first logical path from the parent node, wherein the environmental data is a parameter for executing an instruction for the parent node; and
restore the environmental data associated with the parent node to execute a second logical path from the parent node; and
a malware handler module, implemented at least partially in hardware, to monitor execution of each logical path for malware.

18. The system of claim 17, further comprising
a sandbox environment implemented at least partially in hardware, the execution application module to execute the first and second logical paths within the sandbox environment.

19. The system of claim 17, wherein the malware handler module interfaces with an execution profiler, implemented at least partially in hardware, to evaluate executions of each logical path for malware.

20. The system of claim 17, wherein the environmental data associated with the parent node of the full logical path comprises a register setting associated with executing instructions for the parent node.

21. The computer program product of claim 1, wherein the environmental data for the parent node is restored based on an execution of the first set of instructions.

* * * * *